(12) United States Patent
Horn et al.

(10) Patent No.: US 10,180,680 B2
(45) Date of Patent: *Jan. 15, 2019

(54) TUNING SYSTEM AND METHOD FOR IMPROVING OPERATION OF A CHEMICAL PLANT WITH A FURNACE

(71) Applicant: UOP LLC, Des Plaines, IL (US)

(72) Inventors: Ian G. Horn, Streamwood, IL (US); Christophe Romatier, Wilmette, IL (US); Paul Kowalczyk, Hoffman Estates, IL (US); Zak Alzein, Burr Ridge, IL (US)

(73) Assignee: UOP LLC, Des Plaines, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/084,237

(22) Filed: Mar. 29, 2016

(65) Prior Publication Data

US 2016/0291584 A1   Oct. 6, 2016

Related U.S. Application Data

(60) Provisional application No. 62/140,029, filed on Mar. 30, 2015.

(51) Int. Cl.
*G05B 19/418*   (2006.01)
*G05B 13/04*   (2006.01)

(52) U.S. Cl.
CPC ....... *G05B 19/41865* (2013.01); *G05B 13/04* (2013.01); *G05B 2219/41077* (2013.01); *Y02P 90/18* (2015.11); *Y02P 90/26* (2015.11)

(58) Field of Classification Search
None
See application file for complete search history.

(56) References Cited

U.S. PATENT DOCUMENTS

| 5,666,297 | A | 9/1997 | Britt et al. | |
| 6,038,540 | A * | 3/2000 | Krist | G05B 13/00 700/36 |
| 6,795,798 | B2 | 9/2004 | Eryurek et al. | |
| 7,067,333 | B1 * | 6/2006 | Pasadyn | G05B 17/02 257/48 |
| 7,246,039 | B2 | 7/2007 | Moorhouse | |
| 7,313,447 | B2 | 12/2007 | Hsiung et al. | |

(Continued)

OTHER PUBLICATIONS

Maybeck 'Stochastic Models, Estimation, and Control' vol. 1, Academic Press (1979).*

*Primary Examiner* — Mohammad Ali
*Assistant Examiner* — Bernard G Lindsay
(74) *Attorney, Agent, or Firm* — Greer Burns & Crain, Ltd.

(57) ABSTRACT

A tuning system for improving operation of a plant. A server is coupled to the tuning system for communicating with the plant via a communication network. A computer system has a web-based platform for receiving and sending plant data related to the operation of the plant over the network. A display device interactively displays the plant data. A reconciliation unit is configured for reconciling actual measured data from the plant in comparison with a performance process model result from a simulation engine based on a set of predetermined reference or set points. The reconciliation unit performs a heuristic analysis against the actual measured data and the performance process model result using a set of predetermined threshold values.

18 Claims, 3 Drawing Sheets

(56) References Cited

U.S. PATENT DOCUMENTS

| | | | |
|---|---|---|---|
| 7,925,979 B2 | 4/2011 | Forney et al. | |
| 8,050,889 B2 | 11/2011 | Fluegge et al. | |
| 8,055,371 B2 | 11/2011 | Sanford et al. | |
| 2002/0123864 A1* | 9/2002 | Eryurek | G05B 23/0254 702/188 |
| 2002/0179495 A1* | 12/2002 | Heyse | C10G 35/04 208/137 |
| 2006/0259163 A1* | 11/2006 | Hsiung | G05B 15/02 700/30 |
| 2007/0059838 A1* | 3/2007 | Morrison | F25J 3/0219 436/55 |
| 2010/0262900 A1 | 10/2010 | Romatier et al. | |
| 2015/0185716 A1* | 7/2015 | Wichmann | F01K 23/101 700/287 |

\* cited by examiner

TUNING SYSTEM AND METHOD FOR IMPROVING OPERATION OF A CHEMICAL PLANT WITH A FURNACE

CROSS-REFERENCE

This application claims priority of U.S. Provisional Application Ser. No. 62/140,029 filed Mar. 30, 2015 under 35 U.S.C. § 119(e), which is incorporated herein by reference in its entirety.

FIELD OF THE INVENTION

The present invention is related to a method and system for tuning process models of a plant, such as a chemical plant or refinery, and more particularly to a method for improving operating performance of such a plant using a threshold analysis.

BACKGROUND OF THE INVENTION

Companies operating refineries and petrochemical plants typically face tough challenges in today's environment. These challenges can include eroding financial margins, increasingly complex technologies, a reduction in workforce experience levels, and constantly changing environmental regulations.

Furthermore, as feed and product prices become more volatile, operators often find it more difficult to make the operating decisions that can optimize their financial margin. This volatility may be unlikely to ease in the foreseeable future; however, it can represent economic potential to those companies that can quickly identify and respond to market opportunities as they arise.

Pressures from capital markets generally force operating companies to continually increase the return on existing assets. In response, catalyst, adsorbent, equipment, and control system suppliers develop more complex systems that can increase asset performance. Maintenance and operations of these advanced systems generally requires increased skill levels that can be difficult to develop, maintain, and transfer given the time pressures and limited resources of today's technical personnel. This means that these increasingly complex systems are not always operated to their highest potential. In addition, when existing assets are operated close to and beyond their design limits, reliability concerns and operational risks can increase.

Plant operators typically respond to above challenges with one or more of several strategies, such as, for example, availability risk reduction, working the value chain and continuous economic optimization. Availability risk reduction generally places an emphasis on achieving adequate plant operations as opposed to maximizing economic performance. Working the value chain typically places an emphasis on improving the match of feed and product mix with asset capabilities and market demands. Continuous economic optimization often employs tools, systems and models to continuously monitor and bridge the economic and operational gaps in plant performance.

There are multiple levels of gaps (or performance deficits) that refinery operators typically experience:

1) Events or "Lost Opportunities" Gap

Most refinery operators can sufficiently track the cost/value of unplanned events in their refineries: unplanned shutdowns, equipment availability problems, etc. The value associated with these gaps is generally large, but the duration is normally short. Well-operated refineries can keep these events to a minimum through effective process and mechanical reliability programs.

2) Backcasting Gap

Some refineries focus on a backcasting (historical) gap in which the operator compares the monthly refinery production plan against the actual achieved operations, and conducts an analysis to understand and resolve the cause(s) for any gap(s). This is typically done on a monthly basis. Refinery operators can often uncover substantial economic improvement if they resolve the root causes for deviation from refinery production process plans.

However, when root causes are embedded in poor process performance, they are often difficult to identify. This historical backcasting analysis also can be costly in that it leaves issues unidentified and un-resolved until the end of the month. As an example only, a 1% debit in octane-barrel production from a 30,000 BPD reforming unit can be worth $530,000 over a month (based upon a $0.60/oct-bbl valuation). Early identification of this gap and resolution of the problems can avoid significant profit losses. It is important to maintain continuous and consistent levels of desired performance when optimizing a particular process based on various plant process models to ensure consistent and viable results.

Therefore, there is a need for an improved tuning system for operators to respond to these challenges by utilizing a strategy of economic optimization which employs tools, systems and models to monitor and bridge the economic and operational gaps in plant performance.

SUMMARY OF THE INVENTION

A general object of the invention is to improve operation efficiency of chemical plants and refineries. A more specific object of this invention is to overcome one or more of the problems described above. A general object of this invention can be attained, at least in part, through a method for improving operation of a plant. The method includes obtaining plant operation information from the plant.

The present invention further comprehends a method for improving operation of a plant that includes obtaining plant operation information from the plant and generating a plant process model using the plant operation information. This invention still further comprehends a method for improving operation of a plant. The method includes receiving plant operation information over the internet and automatically generating a plant process model using the plant operation information.

The present invention ensures that a simulation engine is systematically tuned to provide a sound basis for plant optimization. Key matching parameters are defined and reconciled based on associated reference points, and differences of all parameters are cumulatively assessed to determine a fitness of the simulation compared to actual plant operations. As described in greater detail below, a threshold value is defined and determined to assess the need for additional tuning of the simulation engine based on the fitness of the simulation.

The present invention utilizes configured process models to monitor, predict, and optimize performance of individual process units, operating blocks and/or complete processing systems. Routine and frequent analysis of predicted versus actual performance allows early identification of operational discrepancies which can be acted upon to optimize financial impact.

The present invention utilizes process measurements from any of the following devices: pressure sensors, differential pressure sensors, orifice plates, venturi, other flow sensors, temperature sensors, capacitance sensors, weight sensors, gas chromatographs, moisture sensors, and other sensors commonly found in the refining and petrochemical industry, as is known in the art. Further, the present invention utilizes process laboratory measurements from gas chromatographs, liquid chromatographs, distillation measurements, octane measurements, and other laboratory measurements commonly found in the refining and petrochemical industry.

The process measurements are used to monitor the performance of any of the following process equipment: pumps, compressors, heat exchangers, fired heaters, control valves, fractionation columns, reactors and other process equipment commonly found in the refining and petrochemical industry.

This method of this invention is preferably implemented using a web-based computer system. The benefits of executing work processes within this platform include improved plant economic performance due to an increased ability by operations to identify and capture economic opportunities, a sustained ability to bridge performance gaps, an increased ability to leverage personnel expertise, and improved enterprise tuning. The present invention is a new and innovative way of using advanced computing technology in combination with other parameters to change the way plants, such as refineries and petrochemical facilities, are operated.

The present invention uses a data collection system at a plant to capture data which is automatically sent to a remote location, where it is reviewed to, for example, eliminate errors and biases, and used to calculate and report performance results. The performance of the plant and/or individual process units of the plant is compared to the performance predicted by one or more process models to identify any operating differences, or gaps.

A report, such as a daily report, showing actual performance compared to predicted performance can be generated and delivered to a plant operator and/or a plant or third party process engineer such as, for example, via the internet. The identified performance gaps allow the operators and/or engineers to identify and resolve the cause of the gaps. The method of this invention further uses the process models and plant operation information to run optimization routines that converge on an optimal plant operation for the given values of, for example, feed, products and prices.

The method of this invention provides plant operators and/or engineers with regular advice that enable recommendations to adjust setpoints or reference points allowing the plant to run continuously at or closer to optimal conditions. The method of this invention provides the operator alternatives for improving or modifying the future operations of the plant. The method of this invention regularly maintains and tunes the process models to correctly represent the true potential performance of the plant. The method of one embodiment of this invention includes economic optimization routines configured per the operator's specific economic criteria which are used to identify optimum operating points, evaluate alternative operations and do feed evaluations.

The present invention provides a repeatable method that will help refiners bridge the gap between actual and achievable economic performance. The method of this invention utilizes process development history, modeling and stream characterization, and plant automation experience to address the critical issues of ensuring data security as well as efficient aggregation, tuning and movement of large amounts of data. Web-based optimization is a preferred enabler to achieving and sustaining maximum process performance by connecting, on a virtual basis, technical expertise and the plant process operations staff.

The enhanced workflow utilizes configured process models to monitor, predict, and optimize performance of individual process units, operating blocks, or complete processing systems. Routine and frequent analysis of predicted versus actual performance allows early identification of operational discrepancies which can be acted upon to optimize financial impact.

As used herein, references to a "routine" are to be understood to refer to a sequence of computer programs or instructions for performing a particular task. References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, and others interested in, overseeing, and/or running the daily operations at a plant.

In one embodiment, a tuning system is provided for improving operation of a plant. A server is coupled to the tuning system for communicating with the plant via a communication network. A computer system has a web-based platform for receiving and sending plant data related to the operation of the plant over the network. A display device interactively displays the plant data. A reconciliation unit is configured for reconciling actual measured data from the plant in comparison with a performance process model result from a simulation engine based on a set of predetermined reference or set points. The reconciliation unit performs a heuristic analysis against the actual measured data and the performance process model result using a set of predetermined threshold values.

In another embodiment, a tuning method is provided for improving operation of a plant, and includes providing a server coupled to a tuning system for communicating with the plant via a communication network; providing a computer system having a web-based platform for receiving and sending plant data related to the operation of the plant over the network; providing a display device for interactively displaying the plant data, the display device being configured for graphically or textually receiving the plant data; obtaining the plant data from the plant over the network; generating a plant process model based on the plant data for estimating plant performance expected based on the plant data; monitoring a health of the plant based on the plant process model; reconciling actual measured data from the plant in comparison with a performance process model result from a simulation engine based on a set of predetermined reference or set points; creating a scoring model for determining a degree of trustworthiness of the plant process model based on the plant data; and tuning the plant process model based on the scoring model for representing a potential performance of the plant.

The foregoing and other aspects and features of the present invention will become apparent to those of reasonable skill in the art from the following detailed description, as considered in conjunction with the accompanying drawings.

DETAILED DESCRIPTION OF THE INVENTION

Figure 1:
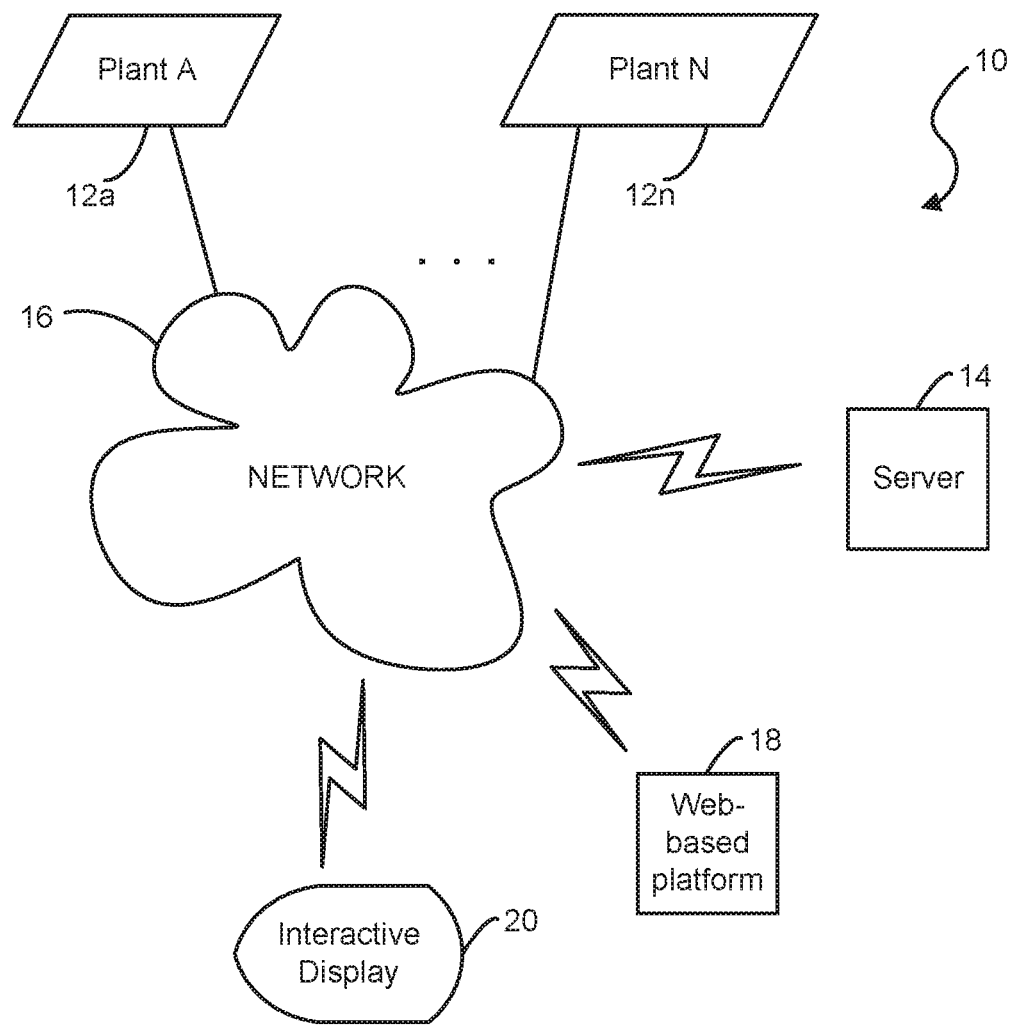
FIG. 1 illustrates an exemplary use of the present tuning system in a cloud computing infrastructure.

Referring now to FIG. 1, an exemplary tuning system, generally designated 10, using an embodiment of the present disclosure is provided for improving operation of one or more plants (e.g., Plant A . . . Plant N)12a-12n, such as a chemical plant or refinery, or a portion thereof. The present tuning system 10 uses plant operation information obtained from at least one plant 12a-12n.

As used herein, the term "system," "unit" or "module" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

The tuning system 10 may reside in or be coupled to a server or computing device 14 (including, e.g., database and video servers), and is programmed to perform tasks and display relevant data for different functional units via a communication network 16, preferably using a secured cloud computing infrastructure. It is contemplated that other suitable networks can be used, such as the internet, a wireless network (e.g., Wi-Fi), a corporate Intranet, a local area network (LAN) or a wide area network (WAN), and the like, using dial-in connections, cable modems, high-speed ISDN lines, and other types of communication methods known in the art. All relevant information can be stored in databases for retrieval by the tuning system 10 or the computing device 14 (e.g., as a data storage device and/or a machine readable data storage medium carrying computer programs).

Further, the present tuning system 10 can be partially or fully automated. In one preferred embodiment of this invention, the tuning system 10 is performed by a computer system, such as a third-party computer system, remote from the plant 12a-12n and/or the plant planning center. The present tuning system 10 preferably includes a web-based platform 18 that obtains or receives and sends information over the internet. Specifically, the tuning system 10 receives signals and parameters from at least one of the plants 12a-12n via the communication network 16, and displays, preferably in real time, related performance information on an interactive display device 20 accessible to an operator or user.

Using a web-based system for implementing the method of this invention provides many benefits, such as improved plant economic performance due to an increased ability by plant operators to identify and capture economic opportunities, a sustained ability to bridge plant performance gaps, and an increased ability to leverage personnel expertise and improve training and development. The method of this invention allows for automated daily evaluation of process performance, thereby increasing the frequency of performance review with less time and effort required from plant operations staff.

The web-based platform 18 allows all users to work with the same information, thereby creating a collaborative environment for sharing best practices or for troubleshooting. The method of this invention provides more accurate prediction and optimization results due to fully configured models which can include, for example, catalytic yield representations, constraints, degrees of freedom, and the like. Routine automated evaluation of plant planning and operation models allows timely plant model tuning to reduce or eliminate gaps between plant models and the actual plant performance. Implementing the method of this invention using the web-based platform 18 also allows for monitoring and updating multiple sites, thereby better enabling facility planners to propose realistic optimal targets.

Figure 2:
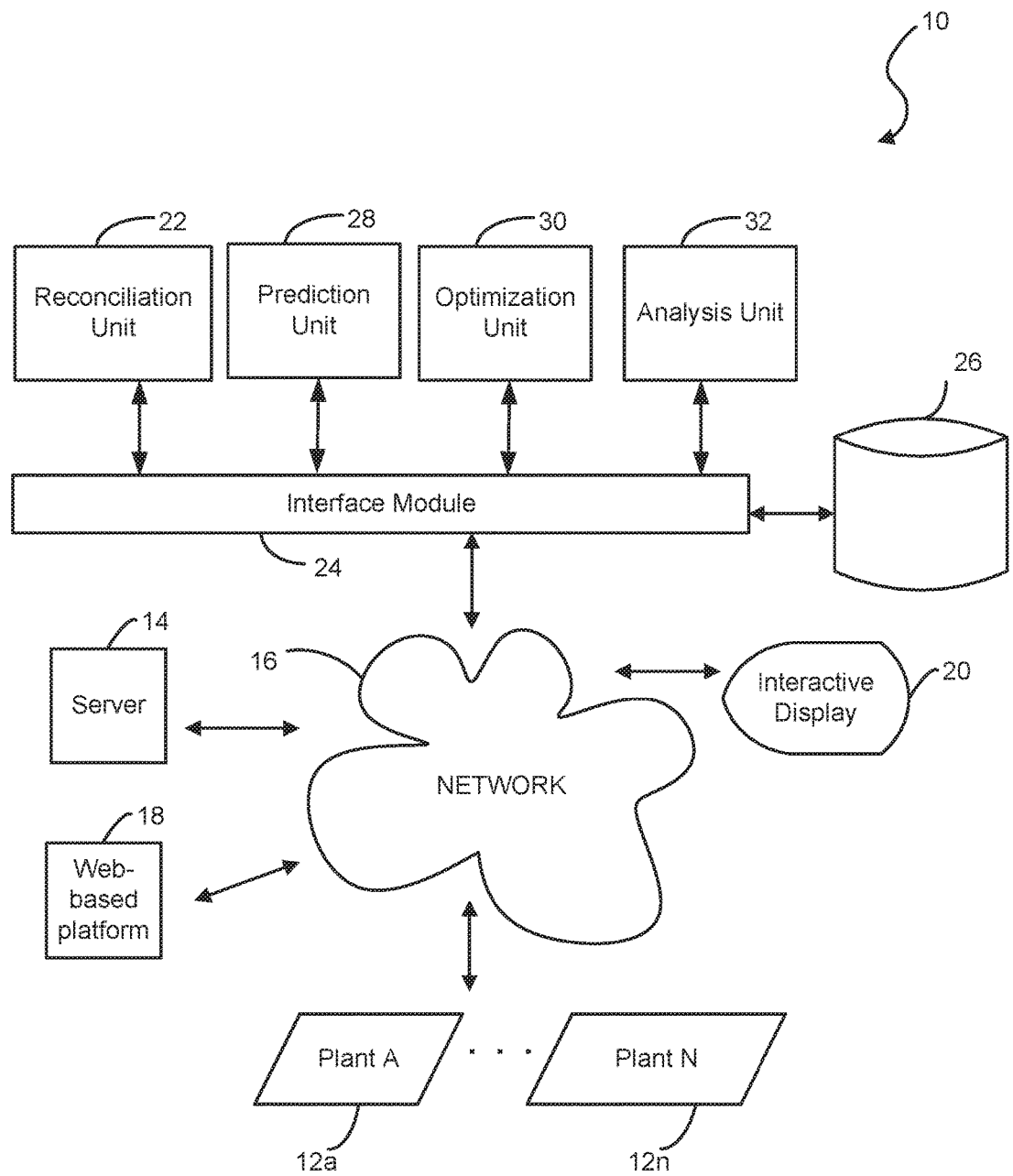
FIG. 2 is a functional block diagram of the present tuning system featuring functional units in accordance with an embodiment of the present disclosure.

Referring now to FIG. 2, it is preferred that the present tuning system 10 includes a reconciliation unit 22 configured for reconciling actual measured data from the respective plants 12a-12n in comparison with performance process model results from a simulation engine based on a set of reference or set points. In a preferred embodiment, a heuristic analysis is performed against the actual measured data and the performance process model results using a set of predetermined threshold values. It is also contemplated that a statistical analysis and other suitable analytic techniques can be used to suit different applications.

As an example only, operating plant parameters or plant data, such as temperatures, pressure levels, feed compositions, fractionation column product compositions, and the like, are received from the respective plants 12a-12n. These plant parameters represent the actual measured data from selected pieces of equipment in the plants 12a-12n during a predetermined time period. Comparisons of these plant operational parameters are performed with the performance process model results from the simulation engine based on the predetermined threshold values.

Also included in the tuning system 10 is an interface module 24 for providing an interface between the tuning system 10, one or more internal or external databases 26, and the network 16. The interface module 24 receives data from, for example, plant sensors via the network 16, and other related system devices, services, and applications. The other devices, services, and applications may include, but are not limited to, one or more software or hardware components, etc., related to the respective plants 12a-12n. The interface module 24 also receives the signals and/or parameters, which are communicated to the respective units and modules, such as the tuning system 10, and its associated computing modules or units.

It is preferred that a prediction unit 28 is provided for predicting a trustworthiness of a current process model of the simulation engine based on the comparisons of the plant operational parameters. It is contemplated that the prediction unit 28 generates or calculates a trustworthiness score of the process model based on the comparisons using a partial least squares (PLS) analysis, an orthogonal PLS (OPLS) analysis, and other suitable analytic techniques as known in the art.

For example, a scoring model is created for determining a degree of trustworthiness of the current process model based on the plant operational parameters. Further, it is preferred that the trustworthiness score is weighted based on an amount of difference between the plant operational parameters and the corresponding predetermined threshold values. The scoring model is updated with the weighted trustworthiness scores, and the current process model is adjusted or tuned based on the scoring model.

More specifically, at least one plant parameter or a subset of the plant parameters is selected as a key matching parameter, and a difference between the selected plant parameter and the corresponding performance model result is assessed cumulatively during a predetermined time period to determine the fitness of the simulation to the related actual plant operations. When the difference is greater than a predetermined threshold value, an additional tuning of the process model is performed. For example, when an error margin of the difference is greater than a predetermined percentage (%) value, the current process model is further evaluated and tuned accordingly.

An optimization unit 30 is provided for optimizing at least a portion of the refining or petrochemical process of at least one plant 12a-12n based on the trustworthiness score of the performance or plant process model. It is difficult for operators in the refining and petrochemical field to optimize the economics at the level of an entire complex of the plant 12a-12n because there are various parameters and measurements that may not provide a cohesive basis for process simulation and optimization.

In operation, the optimization unit 30 receives the actual measured data from a customer site or plant 12a-12n on a recurring basis, such as for example, every 100 milliseconds, every second, every ten seconds, every minute, every two minutes, etc. For data cleansing, the data is analyzed for completeness and corrected for gross errors by the optimization unit 30. Then, the data is corrected for measurement issues (e.g., an accuracy problem for establishing a simulation steady state) and overall mass balance closure to generate a duplicate set of reconciled plant data.

The corrected data is used as an input to a simulation process, in which the process model is tuned to ensure that the simulation process matches the reconciled plant data. An output of the reconciled plant data is input into a tuned flowsheet, and then is generated as a predicted data. Each flowsheet may be a collection of virtual process model objects as a unit of process design. A delta value, which is a difference between the reconciled data and the predicted data, is validated to ensure that a viable optimization case is established for a simulation process run.

As a result, the tuned simulation engine is used as a basis for the optimization case, which is run with a set of the reconciled data as an input. The output from this step is a new set of data, namely an optimized data. A difference between the reconciled data and the optimized data provides an indication as to how the operations should be changed to reach a greater economic optimum. In this configuration, the optimization unit 30 provides a user-configurable method for minimizing objective functions, thereby maximizing profitability of the plants 12a-12n.

In a preferred embodiment, the optimization unit 30 defines an objective function as a user-defined calculation of total cost of operation during a particular process, including materials consumed, products produced, and utilities utilized, subject to various constraints. For example, a maximum fractionation column capacity may be determined by a flooding limit of the internal components, and a maximum capacity of a furnace may be determined based on a surface temperature of a tube inside the furnace. Other suitable objective functions are contemplated to suit different applications.

Also included in the present tuning system 10 is an analysis unit 32 configured for determining an operating status of the refinery or petrochemical plant to ensure robust and profitable operation of the plant 12a-12n. The analysis unit 32 determines the operating status based on at least one of a kinetic model, a parametric model, an analytical tool, and a related knowledge and best practice standard.

In a preferred embodiment, the analysis unit 32 receives historical or current performance data from at least one of the plants 12a-12n to proactively predict future actions to be performed. To proactively predict various limits of a particular process and stay within the acceptable range of limits, the analysis unit 32 determines target operational parameters of a final product based on actual current and/or historical operational parameters, e.g., from a flow of steam, a heater, a temperature set point, a pressure signal, and the like.

For example, in using the kinetic model or other detailed calculations, the analysis unit 32 establishes boundaries or thresholds of operating parameters based on existing limits and/or operating conditions. Exemplary existing limits may include mechanical pressures, temperature limits, hydraulic pressure limits, and operating lives of various components. Other suitable limits and conditions are contemplated to suit different applications.

In using the knowledge and best practice standard, based upon, for example, specific know-how, the analysis unit 32 establishes relationships between operational parameters related to the specific process. For example, the boundaries on a naphtha reforming reactor inlet temperature may be dependent on a regenerator capacity and hydrogen-to-hydrocarbon ratio, which is itself dependent on a recycle compressor capacity.

Figure 3:
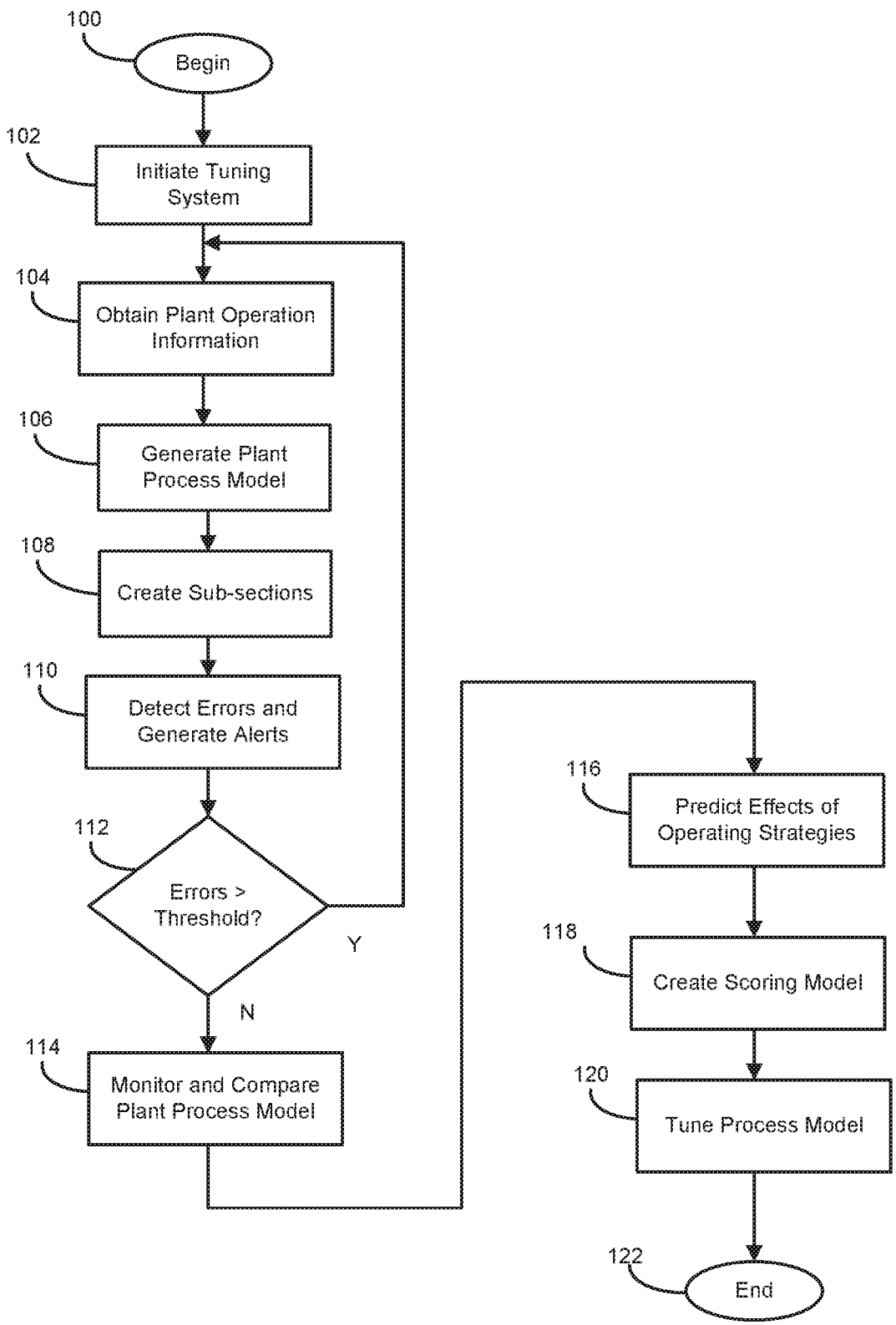
FIG. 3 illustrates an exemplary tuning method in accordance with an embodiment of the present tuning system.

Referring now to FIG. 3, a simplified flow diagram is illustrated for an exemplary method of improving operation of a plant, such as the plant 12a-12n of FIGS. 1 and 2, according to one embodiment of this invention. Although the following steps are primarily described with respect to the embodiments of FIGS. 1 and 2, it should be understood that the steps within the method may be modified and executed in a different order or sequence without altering the principles of the present invention.

The method begins at step 100. In step 102, the tuning system 10 is initiated by a computer system that is inside or remote from the plant 12a-12n. The method is desirably automatically performed by the computer system; however, the invention is not intended to be so limited. One or more steps can include manual operations or data inputs from the sensors and other related systems, as desired.

In step 104, the tuning system 10 obtains plant operation information or plant data from the plant 12a-12n over the network 16. The plant operation information preferably includes plant operational parameters, plant process condition data, plant lab data and/or information about plant constraints. It is contemplated that the plant data includes at least one of: the plant operational parameter, the plant lab data, the plant constraint, and the plant process condition data. As used herein, "plant lab data" refers to the results of periodic laboratory analyses of fluids taken from an operating process plant. As used herein, "plant process data" refers to data measured by sensors in the process plant.

In step 106, a plant process model is generated using the plant operation information. The plant process model estimates or predicts plant performance that is expected based upon the plant operation information, i.e., how the plant 12a-12n is operated. The plant process model results can be used to monitor the health of the plant 12a-12n and to determine whether any upset or poor measurement occurred. The plant process model is preferably generated by an iterative process that models at various plant constraints to determine the desired plant process model.

In step 108, a process simulation unit is utilized to model the operation of the plant 12a-12n. Because the simulation for the entire unit would be quite large and complex to solve in a reasonable amount of time, each plant 12a-12n may be divided into smaller virtual sub-sections consisting of related unit operations. An exemplary process simulation unit 10, such as a UniSim® Design Suite, is disclosed in U.S. Patent Publication No. 2010/0262900, now U.S. Pat. No. 9,053,260, which is incorporated by reference in its entirety. It is contemplated that the process simulation unit 10 can be installed in the optimization unit 30. Other exemplary related systems are disclosed in commonly assigned U.S. patent application Ser. Nos. 15/084,291 and 15/084,319, which are incorporated by reference in their entirety.

For example, in one embodiment, a fractionation column and its related equipment such as its condenser, receiver, reboiler, feed exchangers, and pumps would make up a sub-section. All available plant data from the unit, including temperatures, pressures, and flows, and laboratory data are included in the simulation as measured variables. Multiple sets of the plant data are compared against the process model and model fitting parameters and measurement offsets are calculated that generate the smallest errors.

In step 110, fit parameters or offsets that change by more than a predetermined threshold, and measurements that have more than a predetermined range of error may trigger further action. For example, large changes in offsets or fit parameters may indicate the model tuning may be inadequate. Overall data quality for the set of data may then be flagged as questionable.

In step 112, when the change, difference, or range of error is greater than a predetermined value, control returns to step 104. Otherwise, control proceeds to step 114. Individual measurements with large errors may be eliminated from the fitting algorithm and an alert message or warning signal raised to have the measurement inspected and rectified.

In step 114, the tuning system 10 monitors and compares the plant process model with actual plant performance to ensure the accuracy of the plant process model. Typically, for process models to be effective, they must accurately reflect the actual operating capabilities of the commercial processes. This is achieved by calibrating models to the reconciled data. Key operating variables, such as cut points and tray efficiencies, are adjusted to minimize differences between measured and predicted performance. In one embodiment of this invention, upon a predetermined difference between the plant process model and actual plant performance, the plant process model is updated, and the updated plant process model is used during the next cycle of the method. The updated plant process model is also desirably used to optimize the plant processes.

In step 116, the plant process model is used to accurately predict the effects of varying feedstocks and operating strategies. Consequently, regular updating or tuning of the plant process model according to the method of this invention using reconciled data enables the refiner to assess changes in process capability. A calibrated, rigorous model of this type can enable refinery operations engineers and planning personnel to identify process performance issues, so that they can be addressed before they have a serious impact on operating economics.

For example, calculations such as yields, product properties, and coke production rate can be key indicators of process problems when examined as trends over time. Regular observation of such trends can indicate abnormal declines in performance or mis-operations. It is contemplated that if a rapid decline in $C_5+$ hydrocarbon yields in a naphtha reforming unit is observed, this may indicate an increasing rate of coke production, which then may be traced back to an incorrect water-chloride balance in the reactor circuit or incorrect platforming feed pre-treatment. It is also contemplated that the plant process model can also support improvement studies that consider both short-term operational changes and long-term revamp modifications to generate improved economics on the unit.

In step 118, a scoring model is created for determining a degree of trustworthiness of the current process model based on the plant operational parameters. Specifically, a trustworthiness score of the process model is generated based on comparisons between the plant operational parameters using a partial least squares (PLS) analysis, an orthogonal PLS (OPLS) analysis, and other suitable analytic techniques as known in the art. As discussed above, the comparisons of the plant operational parameters are performed with the performance process model results from the simulation engine based on the predetermined threshold values.

During operation, an output interface is designed to directly relate operational economic performance (e.g., cost of production per ton of product), which is the concern of the plant tuning, to the primary operating variables of the plant (e.g., a flow of steam to a heat exchanger or setpoint on a column composition controller). This is accomplished by relating the economic performance to the plant operation through a cascade of more detailed screens, each of which is designed to allow the user to quickly view which variables are causing the departure from the target economic performance.

A benefit of the method of this invention is its long-term sustainability. Often, projects to improve plant profitability achieve reasonable benefits for a modest duration, but these improvements decay over time. This decay is usually the result of inadequate time and expertise of available in-house technical personnel. Web-based optimization using the method of this invention helps operators bridge existing performance gaps and better leverage the expertise of their personnel in a way that can be sustained in the long term.

Some plant operators have attempted to use locally installed process models to address the optimization needs of a refinery. While several such process model offerings exist in the marketplace, these tools lose value over time as there are inadequate methods for keeping them tuned (e.g. modeling catalyst deactivation, temporary equipment limitations, and the like) and configured to take into account plant flow scheme and equipment modifications. In this configuration, over time, the investment made in acquiring such models does not deliver the intended value. Additionally, the cost associated with performing the model maintenance function can be relatively large and the expertise difficult to maintain or replace. The web-enabled platform specifically addresses these shortcomings by remotely hosting and maintaining the models.

Beyond the technical benefits, implementation of the web-based method of the present tuning system 10 delivers tangible benefits that address the customer's managerial challenges. Such a service aids in improving training and development of technical personnel, automation of business processes and development of operational excellence. Training of new engineers and operators is simplified as there is a central repository of knowledge about the individual process units. Furthermore, engineers can more easily be rotated among several process units to give them broader experience. This rotation can be done with the assurance that consistency of knowledge is transferred by highly repeatable remote performance monitoring processes and by professionals interacting with skilled technical services personnel.

In step 120, the current process model is tuned to correctly represent the true potential performance of the plant based on the scoring model. The process model is further tuned to ensure that the simulation process matches the reconciled plant data. The tuned simulation engine is used as a basis for the optimization case, which is run with a set of the reconciled data as an input. The output from this step is the optimized data. As a result, future operations of the plants 12a-12n are optimized, and productions are maximized.

A business optimization work process is made more predictable by providing a common platform for viewing results to the various stakeholders, such as planners, managers, engineers and technicians. For example, the tuning system 10 is used to provide a simplified and robust look at process units at various locations, thereby allowing quick allocation of resources to process units that either have the highest feed processing opportunity or the most need for maintenance and upgrade.

Further advantage is achieved by utilizing a common infrastructure that clearly establishes links between the plant process and economic performance. As all process, analytical, and economic data are used to provide reports that are linked through process models, all operators can effectively communicate and make decisions from a common set of information, thereby driving the whole organization to focus on continuous economic performance maximization. The method ends at step 122.

While a particular embodiment of the present tuning system has been described herein, it will be appreciated by those skilled in the art that changes and modifications may be made thereto without departing from the invention in its broader aspects and as set forth in the following claims.

SPECIFIC EMBODIMENTS

While the following is described in conjunction with specific embodiments, it will be understood that this description is intended to illustrate and not limit the scope of the preceding description and the appended claims.

A first embodiment of the invention is a system for improving operation of a plant, the tuning system comprising a server coupled to the tuning system for communicating with the plant via a communication network; a computer system having a web-based platform for receiving and sending plant data related to the operation of the plant over the network; a display device for interactively displaying the plant data; and a reconciliation unit configured for reconciling actual measured data from the plant in comparison with a performance process model result from a simulation engine based on a set of predetermined reference or set points, wherein the reconciliation unit performs a heuristic analysis against the actual measured data and the performance process model result using a set of predetermined threshold values. An embodiment of the invention is one, any or all of prior embodiments in this paragraph up through the first embodiment in this paragraph, wherein the reconciliation unit receives the plant data from the plant via the computer system, and the received plant data represent the actual measured data from equipment in the plant during a predetermined time period. An embodiment of the invention is one, any or all of prior embodiments in this paragraph up through the first embodiment in this paragraph, further comprising an interface module configured for providing an interface between the tuning system, a database storing the plant data, and the network. An embodiment of the invention is one, any or all of prior embodiments in this paragraph up through the first embodiment in this paragraph, further comprising a prediction unit configured for predicting a trustworthiness of a current process model of the simulation engine based on the comparison of the plant data. An embodiment of the invention is one, any or all of prior embodiments in this paragraph up through the first embodiment in this paragraph, wherein the prediction unit calculates a trustworthiness score of the corresponding process model based on the comparison of the plant data using an analytic technique. An embodiment of the invention is one, any or all of prior embodiments in this paragraph up through the first embodiment in this paragraph, wherein the prediction unit creates a scoring model for determining a degree of trustworthiness of the corresponding process model based on at least one plant operational parameter. An embodiment of the invention is one, any or all of prior embodiments in this paragraph up through the first embodiment in this paragraph, wherein the trustworthiness score is weighted based on an amount of difference between the plant data and the corresponding predetermined threshold values. An embodiment of the invention is one, any or all of prior embodiments in this paragraph up through the first embodiment in this paragraph, wherein the scoring model is updated with a weighted trustworthiness score, and the current process model is adjusted or tuned based on the scoring model. An embodiment of the invention is one, any or all of prior embodiments in this paragraph up through the first embodiment in this paragraph, wherein the prediction unit cumulatively calculates a difference between a selected plant parameter and the corresponding performance model result during a predetermined time period to determine a fitness of a simulation related to the operation of the plant. An embodiment of the invention is one, any or all of prior embodiments in this paragraph up through the first embodiment in this paragraph, further comprising an optimization unit configured for optimizing at least a portion of the plant based on a trustworthiness score of a plant process model. An embodiment of the invention is one, any or all of prior embodiments in this paragraph up through the first embodiment in this paragraph, wherein the optimization unit defines an objective function as a user-defined calculation of a total cost of the operation during a particular process, including materials consumed, products produced, and utilities utilized, subject to at least one constraint. An embodiment of the invention is one, any or all of prior embodiments in this paragraph up through the first embodiment in this paragraph, further comprising an analysis unit configured for determining an operating status of the plant based on at least one of a kinetic model, a parametric model, an analytical tool, and a related knowledge and best practice standard. An embodiment of the invention is one, any or all of prior embodiments in this paragraph up through the first embodiment in this paragraph, wherein the analysis unit determines a target operational parameter of a final product of the plant based on at least one of an actual current operational parameter and a historical operational parameter.

A second embodiment of the invention is a method for improving operation of a plant, the tuning method comprising providing a server coupled to a tuning system for communicating with the plant via a communication network; providing a computer system having a web-based platform for receiving and sending plant data related to the operation of the plant over the network; providing a display device for interactively displaying the plant data, the display device being configured for graphically or textually receiving the plant data; obtaining the plant data from the plant over the network; generating a plant process model based on the plant data for estimating plant performance expected based on the plant data; monitoring a health of the plant based on the plant process model; reconciling actual measured data from the plant in comparison with a performance process model result from a simulation engine based on a set of predetermined reference or set points; creating a scoring model for determining a degree of trustworthiness of the plant process model based on the plant data; and tuning the plant process model based on the scoring model for representing a potential performance of the plant. An embodiment of the invention is one, any or all of prior embodiments in this paragraph up through the second embodiment in this paragraph, further comprising performing a heuristic analysis against the actual measured data and the performance process model result using a set of predetermined threshold values. An embodiment of the invention is one, any or all of prior embodiments in this paragraph up through the second embodiment in this paragraph, further comprising detecting an error in the tuning of the plant process model based on a predetermined threshold or range. An embodiment of the invention is one, any or all of prior embodiments in this paragraph up through the second embodiment in this paragraph, further comprising monitoring and comparing the plant process model with actual plant performance to ensure an accuracy of the plant process model. An embodiment of the invention is one, any or all of prior embodiments in this paragraph up through the second embodiment in this paragraph, further comprising predicting an effect of an operating strategy of the plant based on the tuning of the plant process model. An embodiment of the invention is one, any or all of prior embodiments in this paragraph up through the second embodiment in this paragraph, further comprising calculating a trustworthiness score of the plant process model based on the comparison of the plant data using an analytic technique. An embodiment of the invention is one, any or all of prior embodiments in this paragraph up through the second embodiment in this paragraph, further comprising generating a set of reconciled plant data of the simulation engine based on the tuned plant process model.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A tuning system for improving operation of a chemical plant, the tuning system comprising:
   a furnace comprising a tube inside the furnace;
   a fractionation column;
   a reboiler associated with the fractionation column;
   a receiver associated with the fractionation column;
   a feed exchanger associated with the fractionation column;
   a server coupled to the tuning system for communicating with the plant via a communication network;
   a computer system having a web-based platform for receiving and sending plant data related to the operation of the plant over the network;
   an interface module comprising:
      one or more processors disposed for receiving signals from the sensor;
      a memory storing executable instructions that, when executed by the one or more processors of the interface module, cause the interface module to:
         receive measured surface temperature data for the tube; and
         providing the measured surface temperature data to a database configured to store the measured surface temperature data;
   an optimization unit comprising:
      one or more processors of the optimization unit;
      a memory storing executable instructions that, when executed by the one or more processors of the optimization unit, cause the optimization unit to:
         receive, via the interface unit, the measured surface temperature data;
         correct the measured surface temperature data for overall mass balance closure;
   a reconciliation unit configured for reconciling actual measured data from the plant in comparison with a performance process model result from a simulation engine based on a set of predetermined reference or set points, the reconciliation unit comprising:
      one or more processors of the reconciliation unit;
      a memory storing executable instructions that, when executed by the one or more processors of the reconciliation unit, cause the reconciliation unit to:
         generate reconciled surface temperature data;
      wherein the memory of the optimization unit further stores executable instructions that, when executed by the one or more processors of the optimization unit, further cause the optimization unit to:
         use the measured surface temperature data to determine whether an upset occurred;
         determine a model fitting parameter for a process model for the chemical plant based on the reconciled surface temperature data;
         adjust a cut point of the chemical plant or a tray efficiency of the chemical plant to minimize differences between measured performance of the chemical plant and predicted performance of the chemical plant;
         optimize the process model using the model fitting parameter for the process model for the chemical plant;
         determine a maximum capacity of the furnace based on the measured surface temperature data for the tube inside the furnace; and
   an analysis unit comprising:
      one or more processors of the analysis platform;
      a memory storing executable instructions that, when executed by the one or more processors of the analysis unit, cause the analysis unit to:
         receive historical performance data for the chemical plant;
         establish relationships between operational parameters related to a process of the chemical plant;
         analyze the historical performance data for the chemical plant as trends over time to identify indicators of process problems for the process of the chemical plant;
         determine target operational parameters of a final product of the chemical plant based on the historical performance data for the chemical plant; and
         predict a limit of the process of the chemical plant based on the target operational parameters of the final product of the chemical plant; and an output interface comprising:
- a display device;
- one or more processors of the output interface;
- a memory storing executable instructions that, when executed by the one or more processors of the output interface, cause the output interface to:
  - generate, for interactive display to an operator of the chemical plant, one or more detailed screens relating performance of the chemical plant to operating variables of the chemical plant;
  - generate and deliver a report showing actual performance of the chemical plant compared to predicted performance of the chemical plant;
  - provide, to the operator of the chemical plant, alternatives for improving or modifying future operations of the chemical plant, the alternatives comprising operational changes and revamp modifications to generate improved performance of the chemical plant; and
  - recommend, to the operator of the chemical plant, the target operational parameters of the final product of the chemical plant;

wherein the reconciliation unit performs a heuristic analysis against the measured surface temperature data and a process model result using a set of predetermined threshold values.

2. The tuning system of claim 1, wherein the interface module provides an interface between the tuning system, the database, and the network.

3. The tuning system of claim 1, further comprising a prediction unit configured for predicting a trustworthiness of a current process model of the simulation engine based on the comparison of the plant data.

4. The tuning system of claim 3, wherein the prediction unit calculates a trustworthiness score of the corresponding process model based on the comparison of the plant data using an analytic technique.

5. The tuning system of claim 3, wherein the prediction unit creates a scoring model for determining a degree of trustworthiness of the corresponding process model based on at least one plant operational parameter.

6. The tuning system of claim 4, wherein the trustworthiness score is weighted based on an amount of difference between the plant data and the corresponding predetermined threshold values.

7. The tuning system of claim 5, wherein the scoring model is updated with a weighted trustworthiness score, and the current process model is adjusted or tuned based on the scoring model.

8. The tuning system of claim 3, wherein the prediction unit cumulatively calculates a difference between a selected plant parameter and the corresponding performance model result during a predetermined time period to determine a fitness of a simulation related to the operation of the plant.

9. The tuning system of claim 1, wherein the optimization unit is configured for optimizing at least a portion of the chemical plant based on a trustworthiness score of the process model.

10. The tuning system of claim 9, wherein the optimization unit defines an objective function as a user-defined calculation of a total cost of the operation during a particular process, including materials consumed, products produced, and utilities utilized, subject to at least one constraint.

11. The tuning system of claim 1, wherein the analysis unit is configured for determining an operating status of the chemical plant based on at least one of: a kinetic model, a parametric model, and an analytical tool.

12. The tuning system of claim 11, wherein the analysis unit determines a target operational parameter of a final product of the plant based on at least one of: an actual current operational parameter and a historical operational parameter.

13. A tuning method for improving operation of a plant, the chemical plant comprising a furnace that includes a tube therein, a fractionation column, a reboiler associated with the fractionation column, a receiver associated with the fractionation column, and a feed exchanger associated with the fractionation column, the tuning method comprising:
- providing a server coupled to a tuning system for communicating with the plant via a communication network;
- providing a computer system having a web-based platform for receiving and sending plant data related to the operation of the plant over the network;
- providing a display device for interactively displaying the plant data, the display device being configured for graphically or textually receiving the plant data;
- receiving measured surface temperature data for the tube;
- providing the measured surface temperature data to a database configured to store the measured surface temperature data;
- correcting the measured surface temperature data for overall mass balance closure;
- generating reconciled surface temperature data;
- using the measured surface temperature data to determine whether an upset occurred;
- determining a model fitting parameter for a process model for the chemical plant based on the reconciled surface temperature data;
- adjusting a cut point of the chemical plant or a tray efficiency of the chemical plant to minimize differences between measured performance of the chemical plant and predicted performance of the chemical plant;
- optimizing the process model using the model fitting parameter for the process model for the chemical plant;
- determining a maximum capacity of the furnace based on the measured surface temperature data for the tube inside the furnace;
- receiving historical performance data for the chemical plant;
- establishing relationships between operational parameters related to a process of the chemical plant;
- analyzing the historical performance data for the chemical plant as trends over time to identify indicators of process problems for the process of the chemical plant;
- determining target operational parameters of a final product of the chemical plant based on the historical performance data for the chemical plant;
- predicting a limit of the process of the chemical plant based on the target operational parameters of the final product of the chemical plant;
- generating, for interactive display to an operator of the chemical plant, one or more detailed screens relating performance of the chemical plant to operating variables of the chemical plant;
- generating and delivering a report showing actual performance of the chemical plant compared to predicted performance of the chemical plant;
- providing, to the operator of the chemical plant, alternatives for improving or modifying future operations of the chemical plant, the alternatives comprising operational changes and revamp modifications to generate improved performance of the chemical plant; and recommending, to the operator of the chemical plant, the target operational parameters of the final product of the chemical plant.

14. The tuning method of claim 13, further comprising performing a heuristic analysis against the measured surface temperature data and a process model result using a set of predetermined threshold values.

15. The tuning method of claim 13, further comprising detecting an error in the tuning of the plant process model based on a predetermined threshold or range.

16. The tuning method of claim 13, further comprising monitoring and comparing the plant process model with actual plant performance to ensure an accuracy of the plant process model.

17. The tuning method of claim 13, further comprising predicting an effect of an operating strategy of the plant based on the tuning of the plant process model.

18. The tuning method of claim 13, further comprising calculating a trustworthiness score of the plant process model based on the comparison of the plant data using an analytic technique.

* * * * *